(12) United States Patent
Friedrich et al.

(10) Patent No.: US 6,260,479 B1
(45) Date of Patent: Jul. 17, 2001

(54) METHOD AND APPARATUS FOR ROASTING COFFEE

(76) Inventors: Jaromir Friedrich, 10625 128 Street, Edmonton, AB (CA), T5N 1W6; Raymond Lemaire, #803 10045-18 Street, Edmonton, AB (CA), T5K 2K2

(*) Notice: Subject to any disclaimer, the term of this patent is extended or adjusted under 35 U.S.C. 154(b) by 0 days.

(21) Appl. No.: 09/538,801

(22) Filed: Mar. 30, 2000

(30) Foreign Application Priority Data

Mar. 31, 1999 (CA) ................................................ 2267608

(51) Int. Cl.[7] .............................. A23L 1/18; A23N 12/08; A47J 31/42; F26B 9/08
(52) U.S. Cl. .......................... 99/468; 99/323.7; 99/331; 99/476; 99/483; 34/233; 34/594
(58) Field of Search ...................... 99/286, 323.5, 99/323.7, 323.9, 331–334, 339, 340, 348, 467, 468, 473–476, 478, 469, 483; 126/21 A, 369; 34/225, 233, 136, 360, 368, 392, 394, 576, 594, 544, 494, 499; 219/400, 386, 385, 502; 392/379, 382, 383, 407; 426/445, 466, 467, 520

(56) References Cited

U.S. PATENT DOCUMENTS

| | | | |
|---|---|---|---|
| 4,271,603 | * | 6/1981 | Moore, III ........................ 34/233 X |
| 4,325,191 | * | 4/1982 | Kumagai et al. .................. 99/286 X |
| 4,425,720 | * | 1/1984 | Elevitch ........................... 219/386 X |
| 4,484,064 | * | 11/1984 | Murray ............................. 219/400 |
| 4,494,314 | * | 1/1985 | Gell, Jr. ............................ 99/323.7 |
| 4,860,461 | * | 8/1989 | Tamaki et al. .................... 99/286 X |
| 4,871,901 | * | 10/1989 | Igusa et al. ....................... 219/400 |
| 5,269,072 | * | 12/1993 | Waligorski ........................ 34/594 |
| 5,359,788 | * | 11/1994 | Gell, Jr. ........................... 99/323.7 X |
| 5,564,331 | * | 10/1996 | Song ................................ 99/469 |
| 5,609,097 | * | 3/1997 | Newnan ........................... 99/483 X |
| 5,638,607 | * | 6/1997 | Lemme et al. ................... 219/385 X |
| 5,735,194 | * | 4/1998 | Cochran ........................... 99/483 |

* cited by examiner

Primary Examiner—Timothy F. Simone
(74) Attorney, Agent, or Firm—David L. Davis

(57) ABSTRACT

Control of the roasting fluidized bed of coffee. It is governed by determining when the pyrolysis of the roasted batch is at its peak. The roasting is then stopped after a predetermined period of time. The following of the commencement of pyrolysis accurately and uniformly determines the starting period for the timing of the stoppage of the process to obtain uniform roasting result. The process is not vulnerable to variations in roasting such as moisture, temperature of the roasting air etc. Air circulation control conduit is provided with a vent port for gases and an inlet port for fresh air, the two ports can be simultaneously opened or closed while the control conduit is simultaneously closed or opened, respectively. Additional air circulation and discharge systems are disclosed and claimed.

8 Claims, 12 Drawing Sheets

METHOD AND APPARATUS FOR ROASTING COFFEE

BACKGROUND OF THE INVENTION

The present invention relates to a method and apparatus for roasting coffee.

Three operations are needed to convert the green coffee beans into consumable beverage: (1) roasting, (2) grinding and (3) brewing. The characteristic flavour and aroma of coffee is developed only by roasting.

Roasting is a time-temperature dependent process, where chemical and a physical changes are caused in the green coffee beans accompanied by loss of dry matter primarily such as gaseous carbon dioxide and water and other volatile products of the pyrolysis. Roasting is normally carried out under atmospheric conditions with hot gases and excess air as primary heating agents. Heat also may be provided by contact with hot metal surfaces, usually as a supplement to convection from the hot gases. The degree of roast plays a major part in determining the flavour characteristic of extracts eventually brewed from roasted coffee, whatever the type.

In general, roasters have been designed and are available based on different mechanical principles as summarized below.

Horizontal rotating drum—solid or perforated wall
Vertical static drum with blades
Vertical rotating bowl
Fluidized bed roaster
Pressure roaster All roasters must also provide a cooling facility to bring the roasted coffee to ambient temperatures after the desired level of roast, usually by contact with cold air.

The known roasters use either "once through" flow of hot air or they recirculate the hot gases developed by roasting. The disadvantage of the first type is a high energy consumption since the incoming air has to be constantly heated to the required temperature. The second type is considered disadvantageous as it is difficult to properly control the roasting cycle. Another disadvantage of the circulated flow of air is in the danger of tar deposits formation on the roasted beans impairing the quality of the final product. The known roasters utilize the clocking of the roast time from the beginning of the process to its end. This is disadvantageous as when only one of many variables of the roasting process or conditions changes, the result is not uniform even for the same type. The changes in variables governing the roasting are inevitable. Every roast, even of the same type, is slightly different from another because of variables such as temperature or moisture.

In a coffee roasting operation, the original moisture present in green coffee beans is first removed. Then the roasting itself starts at a temperature of about 200° C. after which through, exothermic reactions, escalation of the roasting process occurs which requires considerable control of the roasting for a given degree of roast. Reaction in green arabica coffee may start as low as 160° C. The reaction peaks at about 210° C. and falls off at about 250° C.

The most obvious physical change to occur is the external color which ranges from light brown to almost black. This change is accompanied by exudation of oil to the surface with increased severity of roasts. Swelling of beans also progressively occurs.

SUMMARY OF THE INVENTION

It is an object of the present invention to improve the roasting methods and apparatuses such as to avoid or at least reduce the above disadvantages and to provide an improved uniformity of the coffee roasting process.

The invention utilizes, in its one preferred application, the phenomenon of the roasting of coffee being accompanied by the popping or cracking of the beans leading to a considerable decrease of density as a function of the degree of roast but also of the speed of roasting. While different types of coffee beans behave in a different fashion during the roast, the cracking phenomenon always occurs and has a general pattern which is common to all types of coffee. According to the present invention, the peculiar pattern of the popping or cracking sound is followed as a variable which is indicative of the state of pyrolysis of the coffee beans being roasted.

In another aspect, the invention utilizes, as a supplement or replacement of the method mentioned in the preceding paragraph, the pattern of changes in the temperature of the surface of the coffee beans being roasted, or within the roasting circuit, before and after a catalytic converter.

In general terms, the invention provides, in one aspect thereof, a method of controlling the roasting of a batch of a type of coffee in a roasting chamber of a roasting device, comprising the steps of:
(a) charging a batch of nonroasted coffee beans to the roasting chamber;
(b) subjecting the batch to the flow of air having the temperature required for bringing the beans of the batch to the pyrolysis;
(c) establishing the point in time at which pyrolysis of said batch is started by at least one of the steps of:
   (i) analyzing the cracking sound generated by the beans of the batch as the batch is being heated to the point of pyrolysis to establish the first occurrence of the sound quality indicative of the commencement of the pyrolysis;
   (ii) measuring the temperature of the surface of the beans to determine the first occurrence of the temperature change indicative of the commencement of the pyrolysis;
(d) when the commencement of the pyrolysis is established by the step (c), initiating the operation of a clocking device preset to a predetermined time length;
(e) upon expiry of said predetermined time length generating an output signal for stopping the roasting operation and discharging roasted coffee from said roasting chamber.

In another aspect, apparatus is provided for roasting a batch of a type of coffee comprising:
(a) a roasting chamber having a bottom portion and a top portion and operatively associated with heated air supply flowing in a direction from said bottom portion to said top portion;
(b) a sound and/or temperature probe reaching into the roasting chamber;
(c) said sound probe being adapted to sense the pattern of noise generated by the batch in said chamber as it is being roasted;
(d) said temperature probe being adapted to sense the pattern of temperature increase of the surface of coffee beans in said roasting chamber;
(e) said probe and/or probes being operatively connected to an timing device adapted to actuate a signal upon expiry of a predetermined time from a predetermined point of the pattern sensed by the respective probe, a clocking device adapted to actuate a roasting cycle ending device.

In a yet another aspect, the invention provides apparatus for roasting coffee including a roasting chamber adapted to hold a batch of coffee beans to be roasted by hot air, said roasting chamber being disposed within a heated air circulation system, said heated air circulation system further comprising:

(a) air circulation fan device disposed upstream of said roasting chamber and having a pressure side thereof connected to an upstream end of a hot air feeding duct, the downstream end of the hot air feeding duct being operatively connected with a hot air inlet of said roasting chamber at an upstream end of the chamber;

(b) a hot air outlet system of said roasting chamber being disposed at a downstream end of the chamber and being connected to an upstream end of a return duct system, the downstream end of said return duct system being disposed at a suction side of said fan device;

(c) said heated air circulation system being connected to an exhaust conduit system for discharging to the atmosphere at least a part of air present in said heated air circulation system;

(d) said heated air circulation system being further connected to a downstream end of a fresh air supply conduit open at an upstream end thereof, a fresh air valve being disposed between the downstream and upstream ends of the fresh air supply conduit;

(e) air heating device disposed within the heated air circulation system and adapted to maintain the temperature of the heated air in said chamber at a predetermined roasting temperature.

BRIEF DESCRIPTION OF THE DRAWINGS

The invention will now be described by way of a prototype and preferred embodiments, with reference to the enclosed drawings wherein.

DETAILED DESCRIPTION

Figure 2:
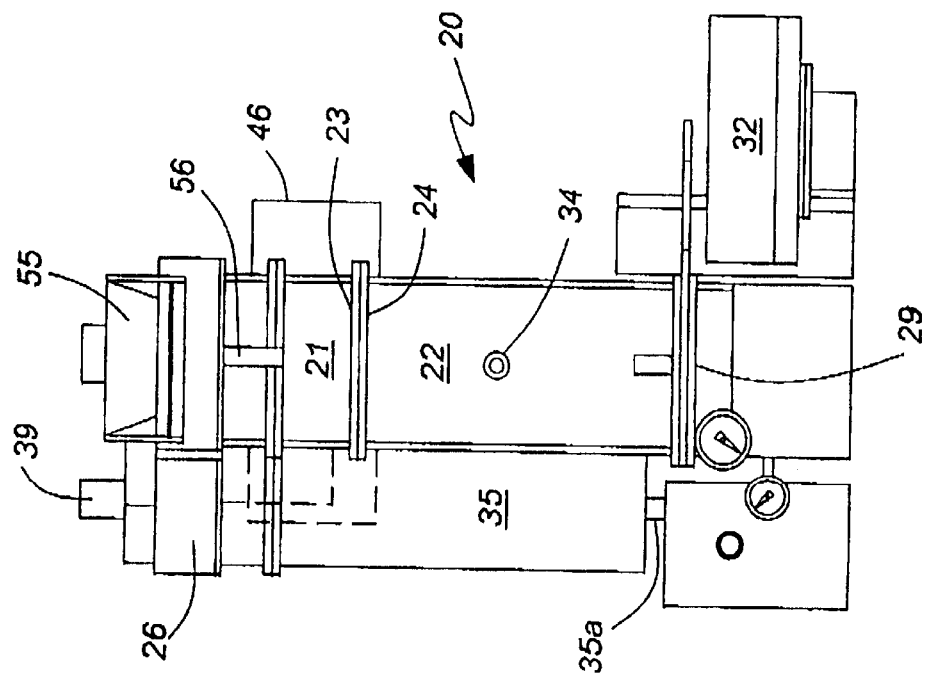
FIG. 2 is a front view taken from the left of FIG. 1.
Figure 1:
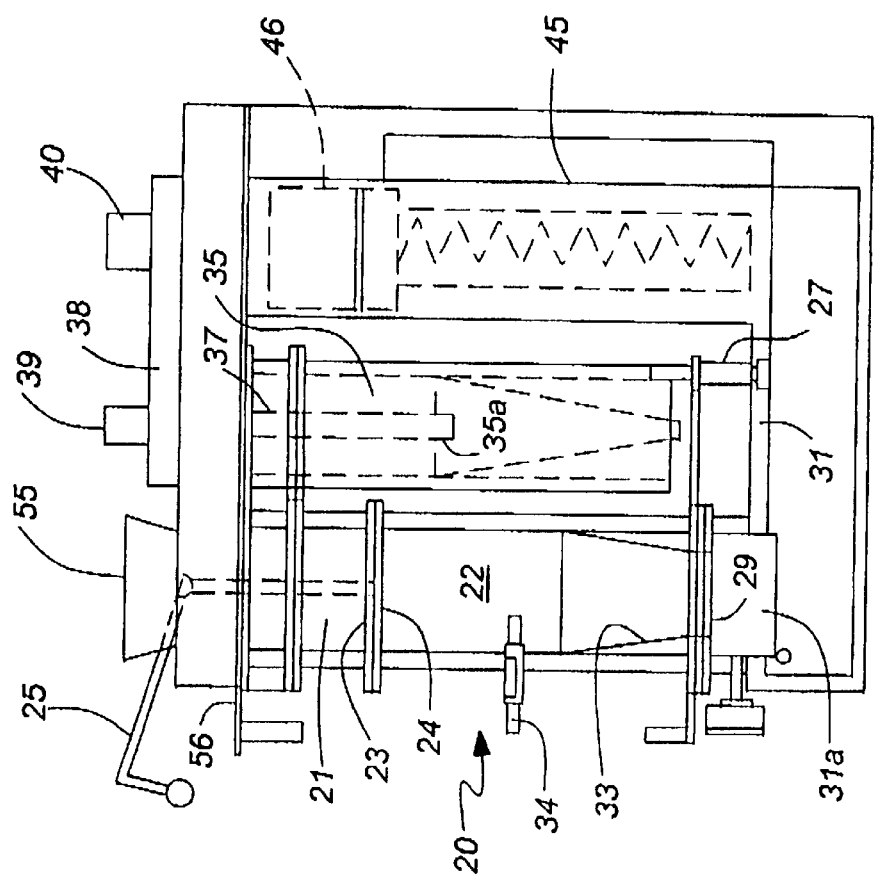
FIG. 1 is a simplified diagrammatic side view of a prototype of the roasting apparatus of the present invention, with certain parts omitted.

The prototype of the roaster includes a cylindric roasting chamber 20 comprising an upper chamber 21 and a lower chamber 22. There are flanges 23, 24 with a heat resistant seal (not shown) secured to one of the flanges 23, 24 to sealingly engage the opposed flange when the upper and lower chambers 21, 22 are aligned such as shown in FIG. 1 or FIG. 4. A locking lever 25 (FIG. 1) is operatively associated with the upper chamber 21 to press the two flanges 23, 24 to each other to secure a sealing engagement between the two and also to sealingly press the bottom end of the lower chamber 22 against a base plate 24a. The upper chamber 21 communicates, via a tangential inlet 26 (FIG. 3) with a cyclone separator to be described later. The top of the upper chamber 21 is provided with a hopper 55 shown only in FIGS. 1 and 2, provided with a manually operated knife valve 56.

Figure 3:
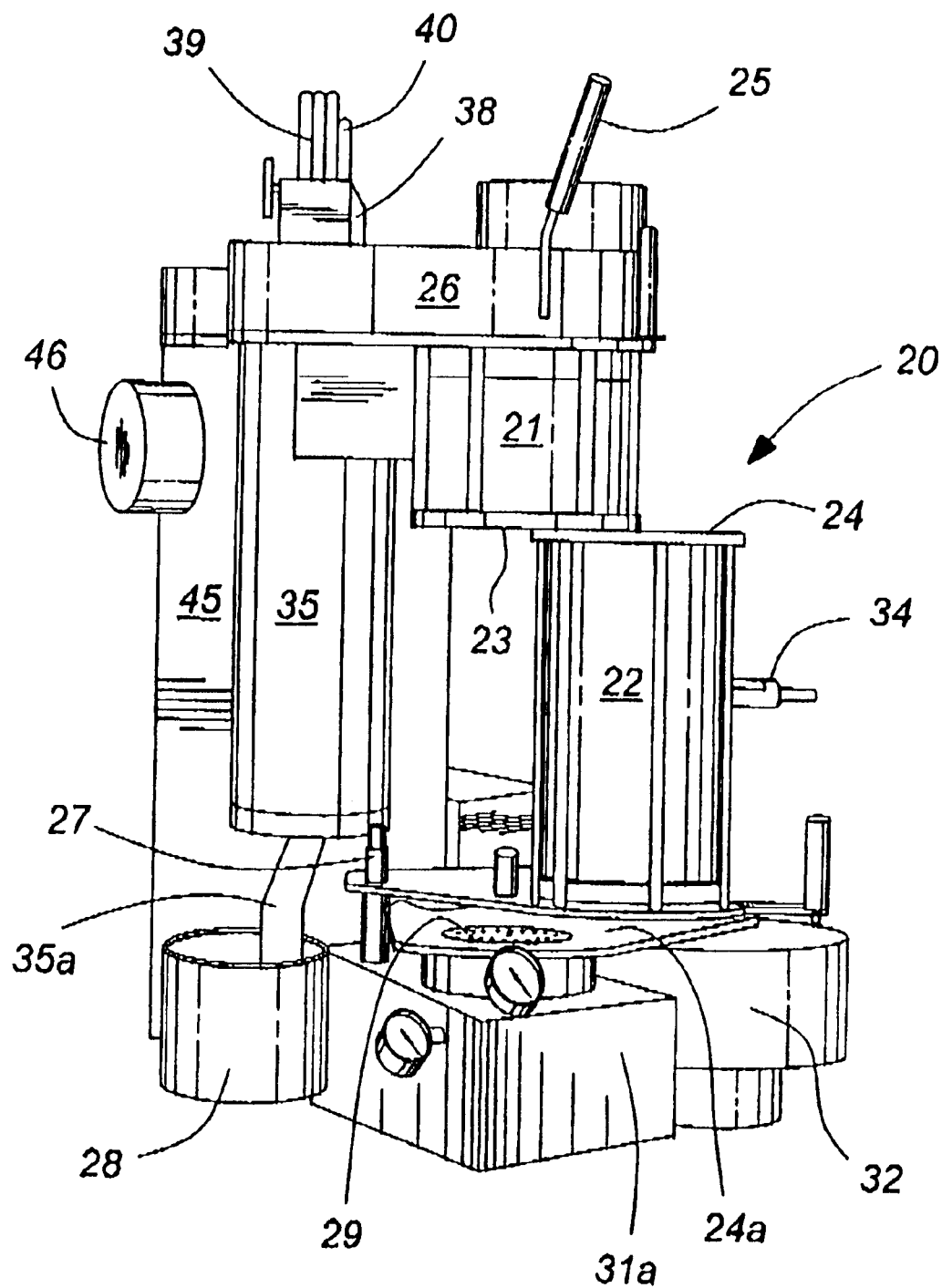
FIG. 3 is a perspective view of the apparatus showing the roasting chamber in a discharge mode.
Figure 4:
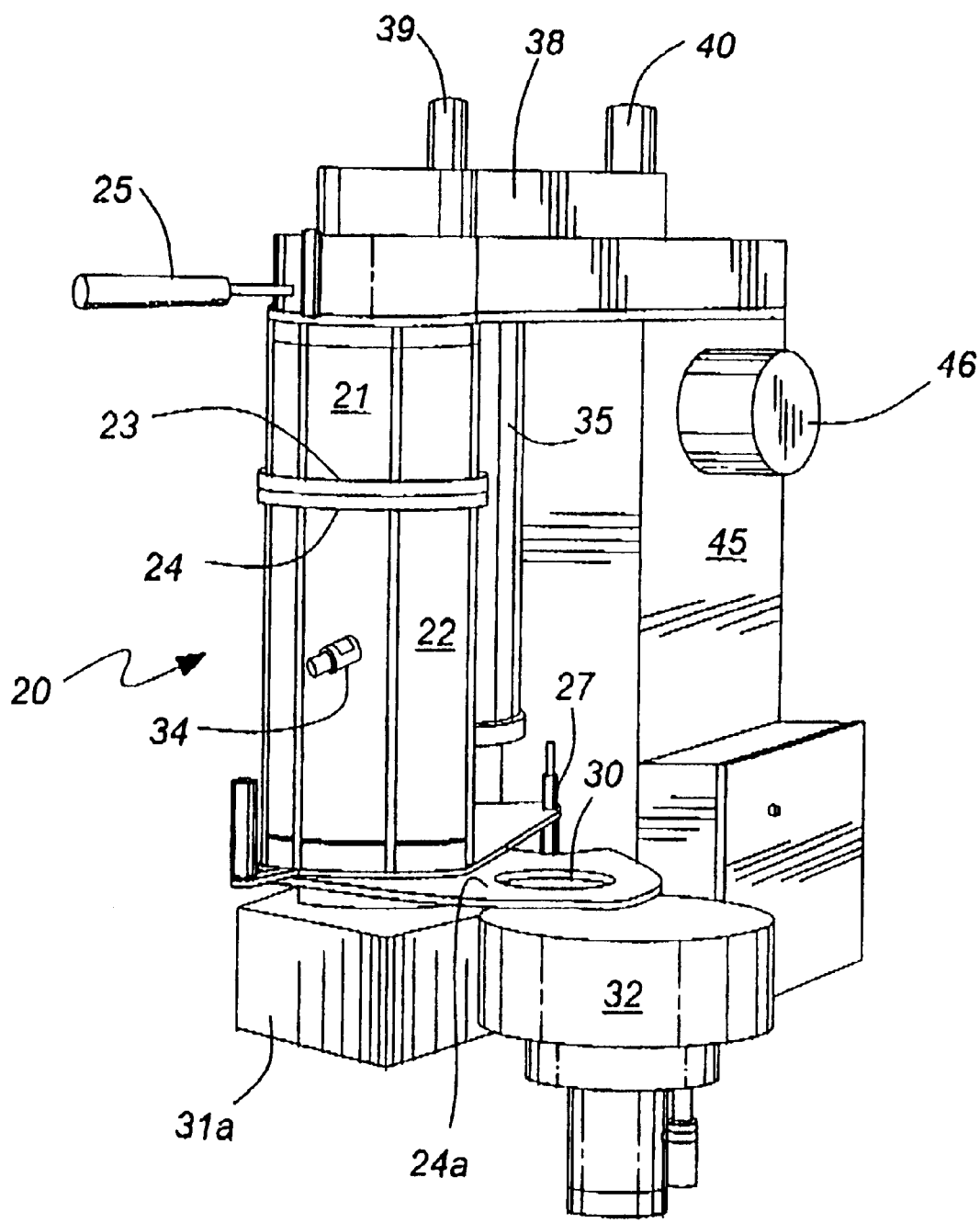
FIG. 4 is a perspective view of the apparatus showing the roasting chamber in a roasting mode.
Figure 5:
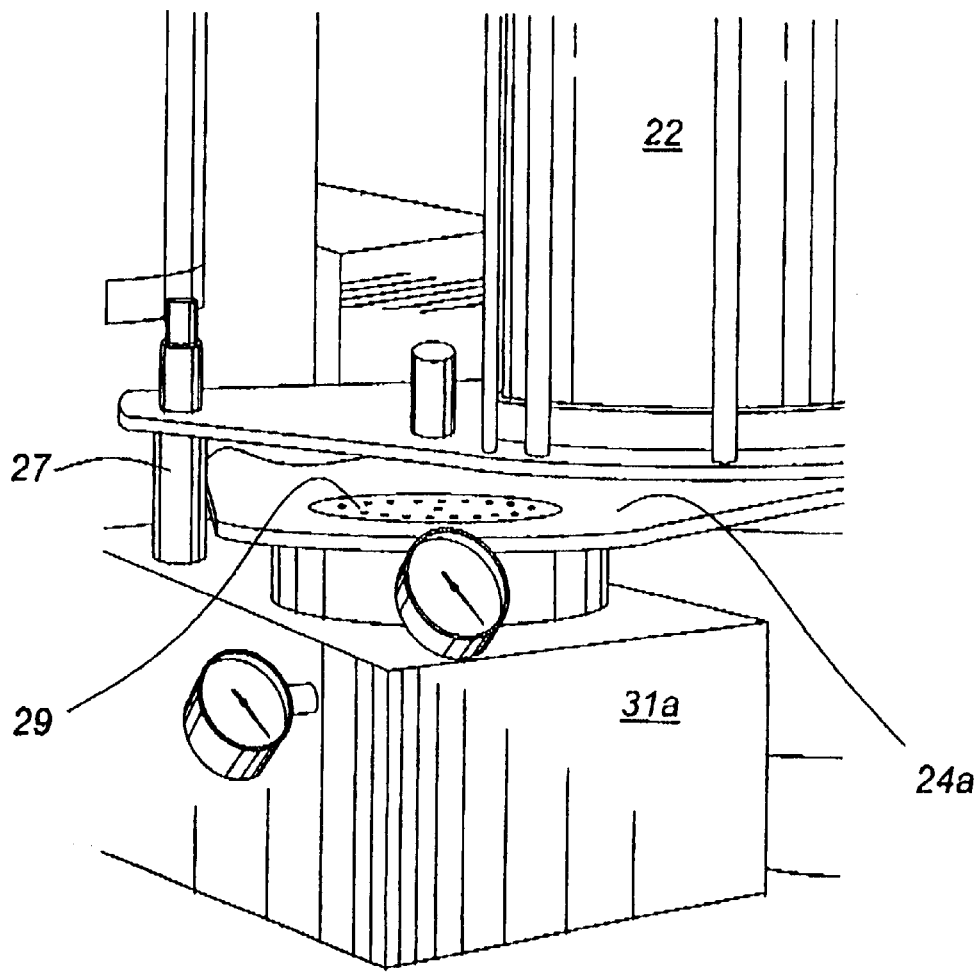
FIG. 5 is a partial perspective view of a lower portion of the environs of the roasting chamber in an open state.

The lower end of the lower chamber 22 is pivotably secured to a pivot 27 which permits the lower chamber 22 to assume a first position of FIG. 1 or 4, i.e. coaxial with the upper chamber 21, and a second position of FIG. 3 or 5, by pivoting same over an arc of about 40°.

The lower end of the chamber 22 sealingly slides on the support plate 24a which has two circular passages therein. The first passage 29 is provided with a pattern of perforations allowing passage of air but being smaller in size than a coffee bean. The second, discharge passage 30 has a diameter similar to that of the first passage 29 but is of the type of a plain bore. The first passage 29 is located on top of a pressure air chamber 31a at the downstream end of a lower duct 31 while the discharge passage is located above a discharge container 32 (FIG. 2). The bottom portion of the interior of the lower chamber 22 is provided with a truncated cone 33 the lower end of which has the diameter corresponding to the diameter of the passages 29, 30. Accordingly, when the lower chamber 22 is moved into alignment with the upper chamber 21, it is also aligned with the first passage 29. Pressurized air may then flow into the chamber 20 through the perforated first passage 29. When the lower chamber 22 is pivoted about the pivot 27 to a discharge position, the contents of the chamber fall through the cone 33 into the discharge container or cooler 32.

A sampler 34 located in the wall of the lower chamber 22 serves the purpose of visual checkup of the coffee beans treated in the chamber 22. In principle, it is just a spoon-like element which is normally disposed inside, but can be pulled temporarily outside of the chamber 22. The sampler is adapted to prevent hot air and unscooped beans from escaping from the chamber 20 as the sample of the beans is taken out of the chamber and examined, to be later returned back into the chamber 20 by simply pushing the sampler back to its initial, inverted closed position. The samplers of this type are known and therefore do not have to be described in greater detail.

Figure 7:
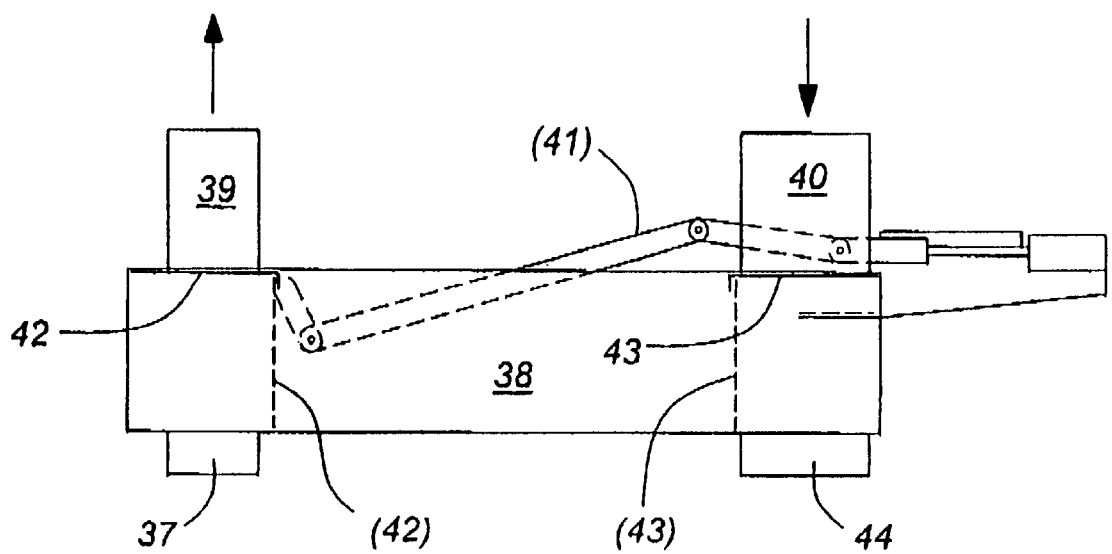
FIG. 7 is a partial side view showing the air circulation control of the prototype.

As already mentioned, a tangential inlet 26 communicates the upper chamber 21 with a top portion of a cyclone separator 35. The cyclone separator 35 is of a known design and operating principle. Briefly, it separates chaff from the flow of air coming from the roasting chamber 20. The chaff falls down, by gravity, through the tip of a cone 36 and through a discharge tube 35a shown in FIG. 3, into a chaff collecting container 28 (omitted from some figures). The air cleaned of chaff by centrifugal force exits at a top outlet 37 communicating with the circulation control box 38 (FIG. 7).

The circulation control box 38 has an air vent port 39 and a fresh air inlet port 40. A lever system 41 simultaneously operates a vent flap 42 and a fresh air control flap 43. Both flaps 42, 43 can assume a position where they control their respective ports. Thus, in a position shown in broken line in FIG. 7, the flap (42) closes the circulation box 38 permitting chaff free gases from the cyclone 35 to be discharged through the outlet 37 and vent port 39 into the atmosphere. Preferably, the discharge is effected through a catalytic converter, not shown in FIGS. 1–7, as will be described with reference to FIGS. 9–15. In an opposite extreme (solid line), the flap 42 closes the vent port 39, forcing air coming from the cyclone 35 to flow into the control box 38. The flap 43 of fresh air is moved simultaneously with the flap 42. In the mode of FIG. 7, the flap (43) closes the box 38 permitting flow of fresh air through the port 40 and into an inlet 44 of an air heating chamber 45 having heating elements and adapted to heat the incoming air to a predetermined temperature. Circulation fans 46 (FIG. 2, 3), indicated only diagrammatically, force the air through the entire system. It can thus be observed that two extreme modes can be assumed by the flaps 42, 43: (a) the circulation closed mode where the flap 42 closes the circulation control box 38 and opens the vent 39, while the flap 43 closes the circulation control box 38 and opens fresh air inlet 40, or (b) the circulation mode where the flap 42 closes the vent 39 opening the circulation box 38 while the flap 43 closes the fresh air port 40 opening the box 38 to permit circulation of gases coming from the separator 35 to pass again through the air heater 35. Intermediate positions with the ports 39, 40 and box 38 partly open can also be achieved.

The fresh or hot air is thus forced to flow down through the heater 35, into the pressure air chamber 31a and into the roasting chamber 20, generating the fluidization effect on the coffee bean charge in the chamber 20 simultaneously with the roasting thereof.

Further circulation modes may be provided as will be described later.

Figure 6:
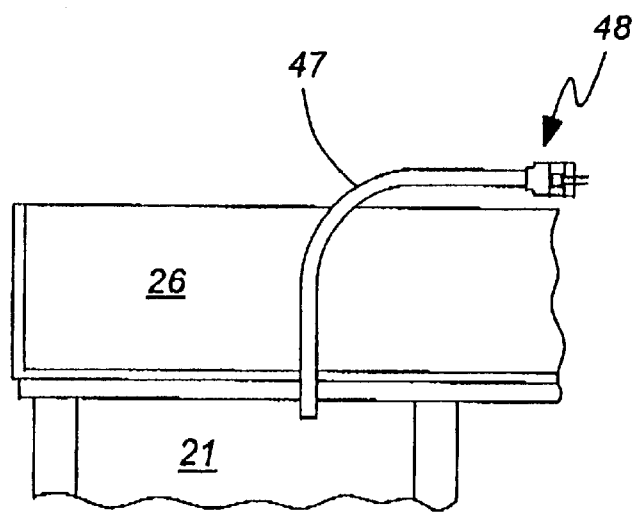
FIG. 6 is a diagrammatic representation, in a side view, of the upper portion of the roasting chamber with certain parts omitted.
Figure 8A:
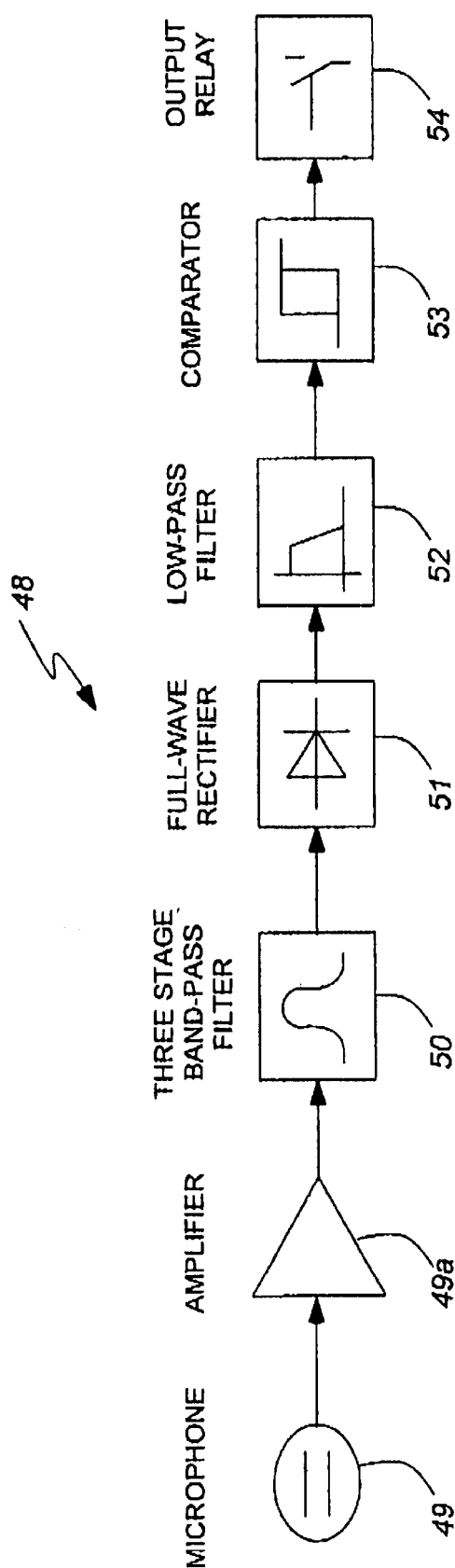
FIG. 8a is a block diagram of the arrangement of a preferred embodiment of the sound analyzing system of the apparatus of the present invention.
Figure 8B:
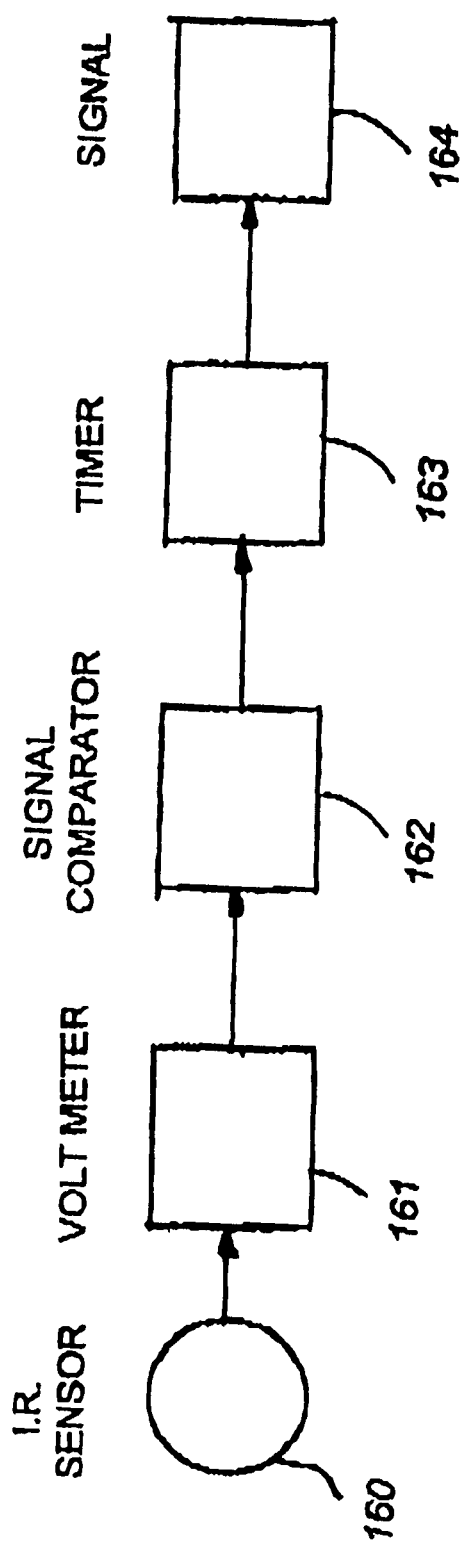
FIG. 8b is a diagram similar to that of FIG. 8a but showing a preferred embodiment of the temperature analyzing system of the apparatus of the present invention.

Turning now to FIG. 6, a check tube 47 reaches into the interior of the upper chamber 21. The tube is operatively associated with a sound analyzing device which is indicated diagrammatically in FIG. 8. Briefly, the system 48 comprises a microphone 49 connected, via an amplifier 49a, to a three-stage band-pass filter 50, full wave rectifier 51, low pass filter 52, a comparator 53 and an output relay 54 which is operatively connected to a clocking device (not shown). The clocking device, in turn, provides suitable signal or activation of controls, to stop the instant roasting cycle. Other known systems can be applied for the same purpose but the arrangement shown is preferred.

The output relay 54 is adapted to cause the control of air circulation depending on the condition of the roasted coffee as will be described. It will be appreciated, however, that different parts or a number of various sections of the roaster can be automatically operated utilizing the output of the device shown in FIG. 8.

In operation of the first embodiment (FIGS. 1–8), the circulation fans of the air heater 45 draw in air from the inlet 40 (the flap 43 closes the circulation control box 38) and discharge it in to heating chamber 45 where is heated to a thermostat controlled temperature from about 250° C. to about 270° C. The heated air then flows (FIG. 1) through the lower duct 31 into the pressure air chamber 31a and through the perforations of the first passage 29 into the lower chamber 22.

The hot air passes through the batch of coffee beans in the roasting chamber bringing the batch into the state of a fluidized bed. The air which has passed through the fluidized bed and through the upper chamber 21, with chaff carried from the roasted beans, passes through the tangential inlet 26 into the cyclone 35 for chaff removal. The chaff is collected at the container 28 (FIG. 3) and the chaff free air exits through the central tube 35a and through the outlet 37 at the top of the cyclone body 35. At this stage the flap 42 closes the vent port 39 and the flap 43 closes the inlet port 40. The air is drawn through the circulation control chamber 38 back into the air heater 45 and circulated to the roasting chamber 20 as described.

Heavy smoke may develop near the end of the roasting operation using the recirculated air. This may result in undesired deposits of tar on the roasted beans which negatively influence the final quality of the product. If heavy smoke develops, the operator interrupts the circulation by activating the lever system 41 such as to move the flap 42 to open the vent 39 and close the circulation control chamber 38 while also opening the inlet 40 to draw fresh air into air heater 45 and hence into the roasting system. The hot air with smoke is vented at 39 to the atmosphere, preferably through a catalytic converter as described hereafter, while fresh air is drawn through the inlet port 40 and into the system. The described system of control of the recirculation of course also permits a partial venting and a partial circulation with a partial intake of fresh air.

The operator is guided by electronically developed activation or signals, it being understood that the activation or signals may also be used to operate one or more elements of the roasting circuit, for instance the recirculation of hot air, temperature control at the heater 45 etc. The present invention provides such activation utilizing a phenomenon which occurs during the roasting of coffee, as will be described later.

Figure 9:
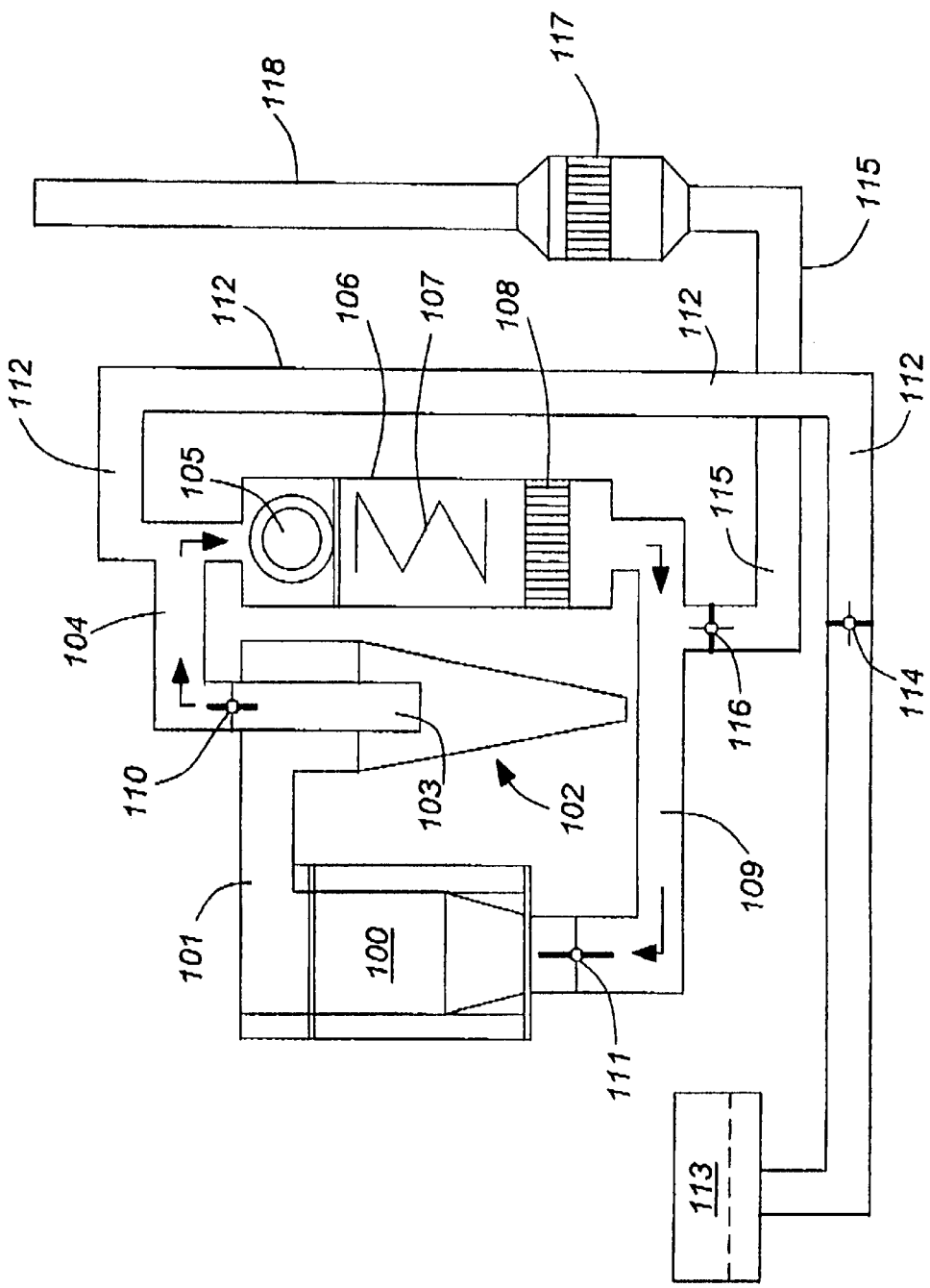
FIG. 9 is a diagram of a modified version of heated air circulation system for a coffee roaster in a roasting mode.
Figure 10:
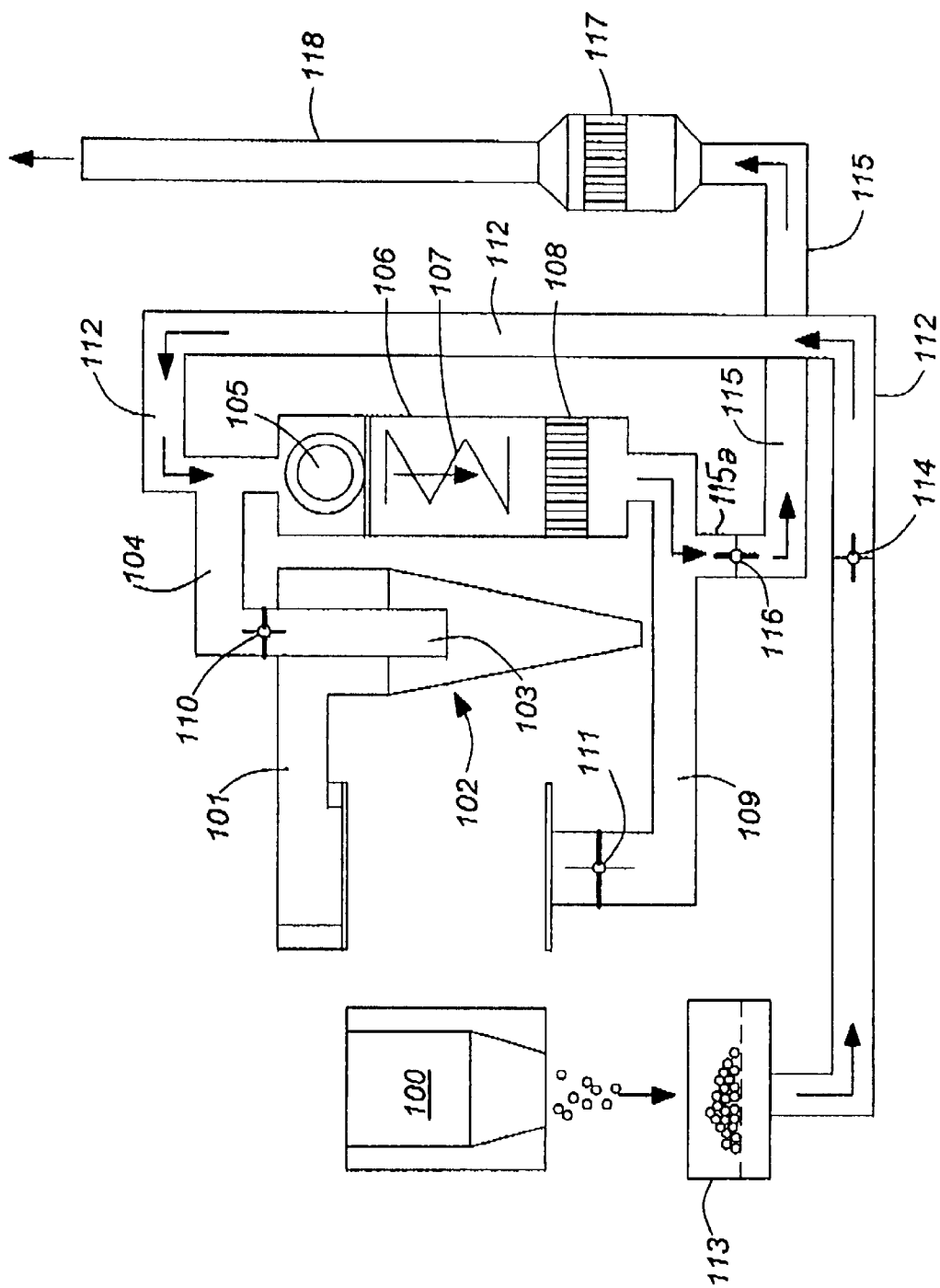
FIG. 10 is a diagram of the circulation system of FIG. 9 shown in a cooling mode.

Turning now to FIGS. 9 and 10, an alternative system of circulation of air through the roaster is shown by way of simplified diagrams. While many of the elements of this diagram have their counterpart in the first embodiment described, some of them (for instance, the hopper for feeding green coffee beans into the roasting chamber or the split of the roasting chamber into upper and lower part) are not shown for clarity. It will therefore be more convenient to use separate reference numbers for the elements of the system shown even though some of them have their corresponding counterparts in the first embodiment shown.

Reference number 100 designates a roasting chamber which, in operation, holds a batch of coffee beans to be processed. The upper end of the roasting chamber 100 is connected, through a tangential duct 101 of a return duct system (corresponding to duct 26) with the upper section of a chaff separator 102 disposed within the return duct system and provided with a central vertical tube 103 which, in turn, communicates with an air duct 104. The air duct 104 thus forms the downstream end portion of the return duct system. The downstream end of the duct 104 connects with a cooler air duct 112. Air circulating fan device 105 is adapted to force air flow from the cooler air duct 112 through an air heating chamber 106 (also referred to as "air heating device," provided with an air heating device including coils 107 and with a catalytic converter 108 at a downstream end of the chamber 106. The coils 107 are activated to provide the roasting temperature at the roasting chamber 100 and also to maintain the temperature of the catalytic converter 108 at an operative value.

The downstream end of the catalytic converter 108 communicates with an upstream end of a return or hot air feeding duct 109. The downstream end of the duct 109, in turn, communicates with the lower end of the roasting chamber 100. There is a first control valve 110 disposed at the upstream end of the air duct 104 and a second control valve 111 disposed at the downstream end of the return duct 109, just before the lower end of the roasting chamber 100.

The cooler air duct 112 communicates, at its end remote from the heating chamber 106, with a cooler 113. The cooler 113 is a functional equivalent of the cooler or discharge container 32 of the prototype. A third control valve 114 (also referred to as a fresh air valve) is adapted to selectively close or open communication of the cooler air duct 112 with the cooler 113.

The return duct 109 also communicates with a branched-off exhaust duct 115 forming a part of what is generally referred to as "exhaust conduit system". A fourth valve 116 is arranged to selectively close or open the communication between the return duct 109 and the exhaust duct 115. A partial opening of the fourth control valve 116 allows partial venting of the return duct 109. The exhaust duct 115 is provided with a catalytic converter 117 disposed upstream of a discharge section 118 of the exhaust duct 115.

Figure 11:
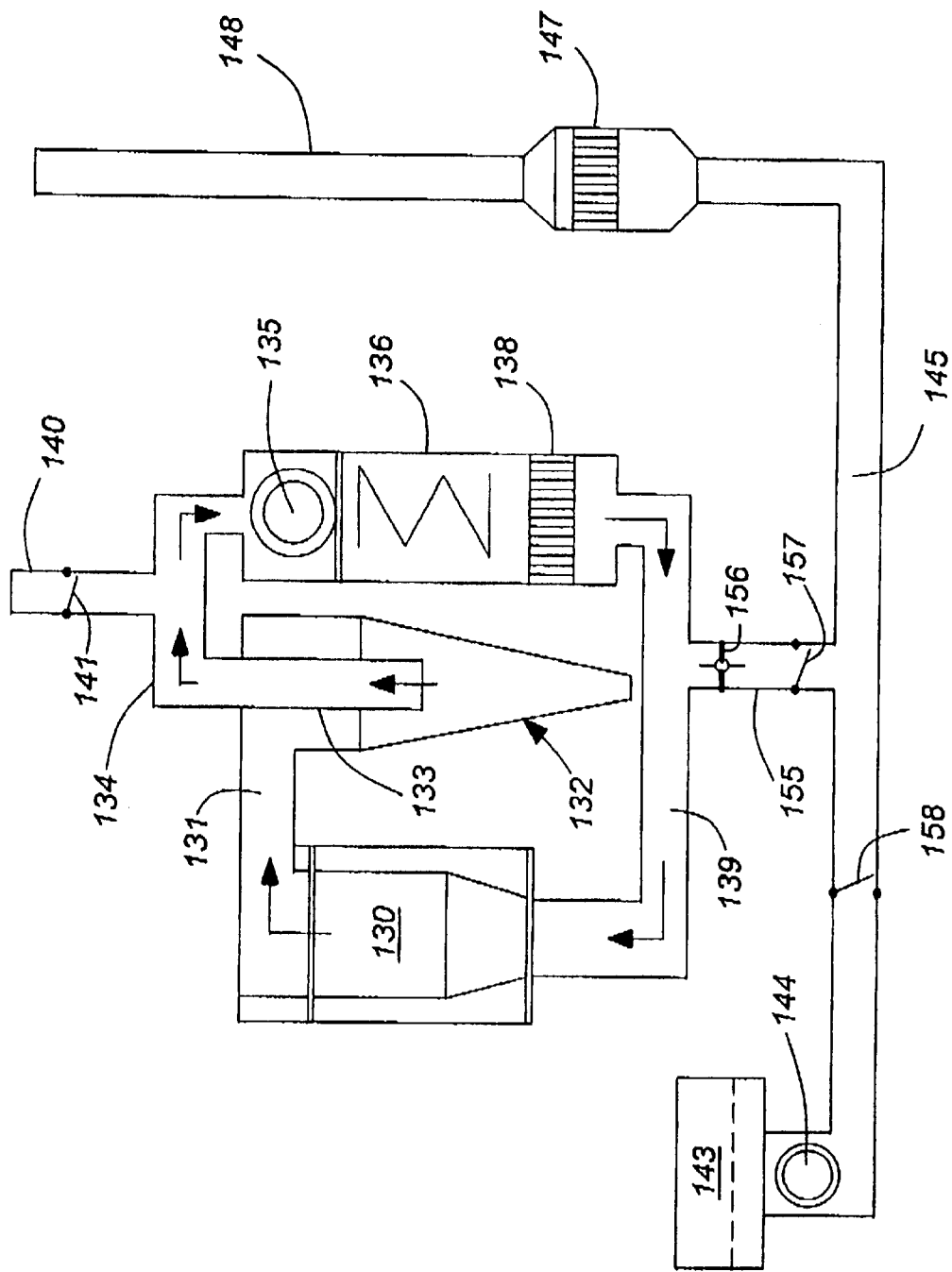
FIG. 11 is a diagram similar to that of FIG. 9 but showing another modification of the air circulation system, in a roasting mode.
Figure 12:
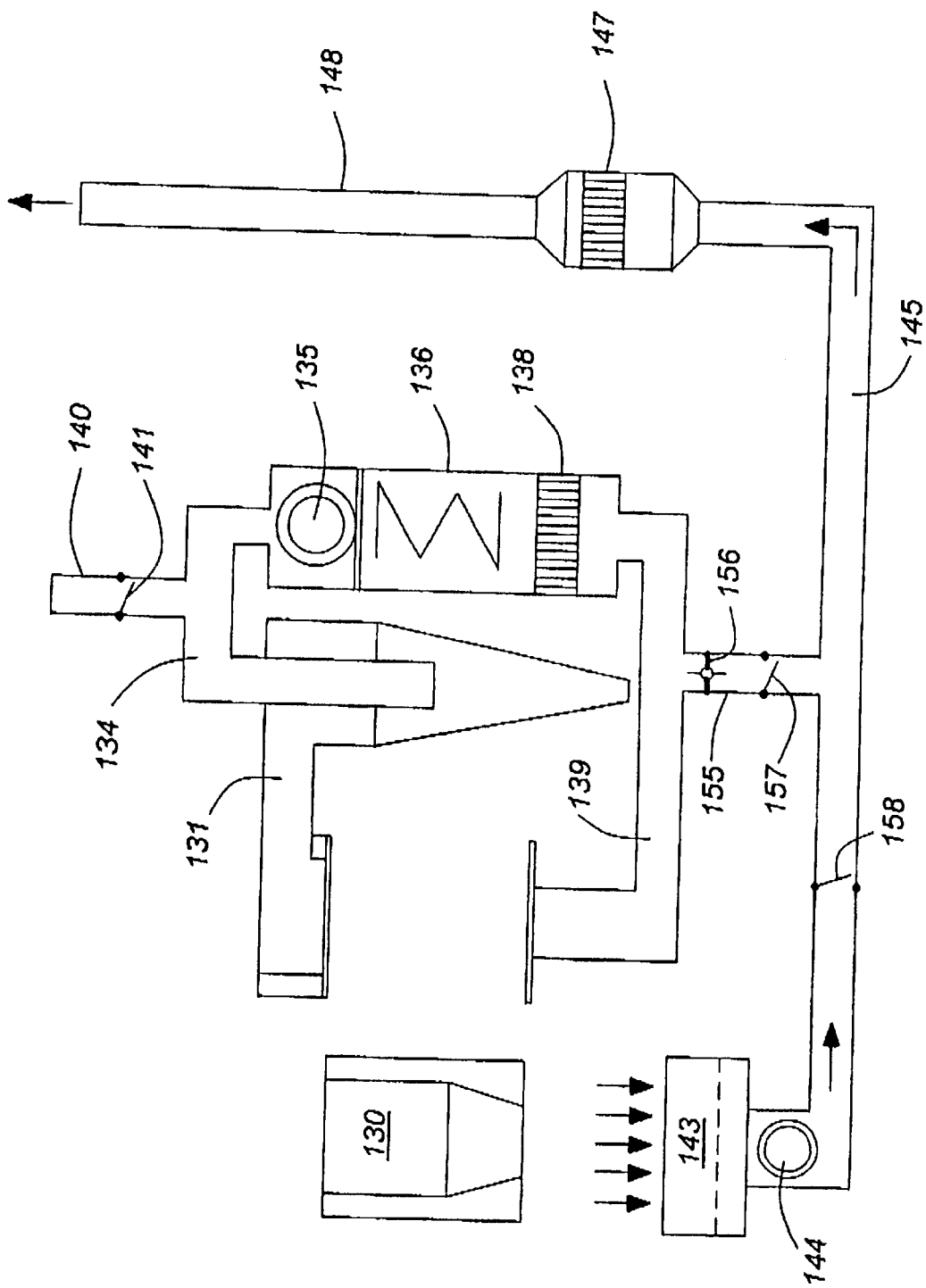
FIG. 12 is a diagram of the circulation system of FIG. 11 shown in a cooling mode.

The air circulation of the embodiment of FIGS. 11 and 12 is as follows. During the roasting cycle (FIG. 9), the roasting chamber 100 contains a batch of coffee beans (not shown). The circulation of air is induced by circulation fan device 105. The air is forced to flow through the heating chamber 106, where it is heated by heating coils 107 and then through the catalytic converter 108 where the volume of undesired substances is removed from the circulating air thus reducing the volume of smoke within the system. The air heated to the desired temperature then flows through the return duct 109 and by the second valve 111 which is now open, into the roasting chamber 100. As in the first embodiment, the heated air performs two basic functions: first, it brings the batch of coffee beans into the state of a fluidized bed; second, it gradually heats the coffee beans to the desired roasting temperature.

Downstream of the roasting chamber 100, the circulating air contains chaff which has to be removed. This is effected by passing the chaff laden air flow coming from the chamber 100 through the tangential duct 101 into the cyclone chaff separator 102. The chaff is separated from air by centrifugal force and driven down by gravity. Eventually, it passes through the lowermost part of the conical chamber into a chaff collecting chamber (not shown in FIGS. 9, 10 but shown in FIG. 3). The chaff free air remains at the core of the swirling air and is removed through the vertical tube 103, past the open first control valve 110 into the air duct 104 from where the air is again drawn by the fans 105 and recirculated through the system as described.

Inevitably, there is pressure drop across the air circulation system. Certain vacuum exists at the suction side of the fans 105, i.e. in the air duct 104. Excessive rise of the vacuum would impair the operation of the cyclone 102 by drawing chaff through the vertical tube 103. Therefore, provision is made to selectively open the third control valve 114 thus to allow fresh air to be drawn to the suction side of the fans 105. This reduces the magnitude of vacuum in the air duct 104.

The third and fourth valves 114, 116 are normally fully closed during the roasting cycle so that the drive by the fans 105 results only in circulation of the roasting air. Partial opening of the control valve 114, however, will permit fresh air to flow from the cooler 113, via the cooler air duct 112 into the system as described.

When the roasting is completed, the second valve 111 and the first valve 110 are both closed thus interrupting the air circulation. The third valve 114 and the fourth valve 116 are open.

The roasting chamber is moved from the position of FIG. 9 to an offset position of FIG. 10, above the collecting chamber or cooler 113, whereby the roasted batch is dumped into the cooler 113. In this state of the valve positions, the air drawing effect of the fans 105 results in the flow of ambient air through the discharged batch of coffee beans, then through the cooler air duct 112 to the suction side of the fans 105 and through the heating chamber 106 into the exhaust duct 115, then through the catalytic converter 117 into the discharge section 118 and out of the system. It can thus be appreciated that the cooler air duct 112 also functions as an embodiment of a fresh air supply conduit, selectively open or closed by the control valve 114.

The advantage of this embodiment is in a more efficient use of the heat generators; one, 107, in the heating chamber 106, the other ahead of the catalytic converter 117, as will be described. The arrangement is also an improvement in that the discharged air having passed through the catalytic converter is cleaner than in the first embodiment as at least some chemical substances brought into the circulation air by the roasting process are burned.

When the cooling cycle is finished, the cooled coffee bean batch is removed from the cooler 113, the valves 114, 116 closed, the roasting chamber 100 brought in alignment with the upright end portion of the return duct 109. The valves 110,111 can now be open whereby the circulation of heated air induced by the fans 105 is repeated as described.

The diagrams of FIGS. 11 and 12 show a yet another, presently preferred embodiment of the circulation system of the roaster. The roasting mode is shown in FIG. 11, the cooling mode in FIG. 12. A substantial improvement in this embodiment is in the provision of an additional, exhaust fan device 144 whereby the need of the control of the opening and closing of the valves, as described above, is eliminated. The control of circulation is provided by controlling the operation of the two fan devices. The fan devices or systems 135, 144 are independent and have an overlapping usage. In particular, when the roasting cycle is finished, the fan system 135 continues to run for the period (about 2–5 seconds) of placement of the roasting chamber 130 over the cooler 143. The fan system 144 is started before such displacement of the chamber 130 and runs until such time as the fumes coming from the discharged batch, and cleaned in the converter 147, are removed. Typically, the time period of the run of the second fan system 144 is from about 90 seconds to about 2 minutes but this may vary from one application to another.

In the roasting mode of this embodiment, the roasting chamber 130 communicates at its top with a tangential duct 131 of a return duct system, the downstream end of which communicates tangentially with the upper portion of a conical chaff separator 132 disposed within the return duct system. As in the preceding embodiments, chaff exits at the bottom of the cone of the cyclone 132, while clean air is removed by the vertical tube 133 and then through the air duct 134, which forms the downstream end portion of the return duct system, to the suction side of the circulation fan device 135, through the heating device or chamber 136 with a heating coils 137, the catalytic converter 138 and return or hot air feeding duct 139 back to the roasting chamber 130.

The fresh air supply conduit 140 with a check valve 141, forming another embodiment of a fresh air valve, prevents the buildup of an excessive vacuum at a point immediately downstream of the cyclone 132 to avoid its malfunction as described above.

When it is established that the roasting of the coffee beans is completed (FIG. 12), the cooler fans 144 are started. With the roasting chamber moved sideways to a position above the collector or cooler 143, the roasted batch is dumped into the cooler 143. The cooler 143 permits passage of air through the discharged roasted batch. The cooler is provided with a removable container for the roasted coffee. The fans 144 draw air through the batch in the cooler, through the check valve 158 into the exhaust ducts 145. The catalytic converter 147 removes the undesired substances forming the roasting smoke and the cleaned air free of chemical residues from the roasting process is then discharged from the discharge section 148. It will thus be appreciated that the described elements form an embodiment of what can generally be referred to as "exhaust conduit system."

If the heated air circulation system 130–139 requires exhaust of some gases, a connecting duct 155 of the exhaust conduit system can be used. It selectively communicates the return duct 139 with the exhaust duct 145. The exhaust of excessive gases is accomplished by opening a control valve 156 in the connecting duct. The pressure of the excessive gases opens the check valve 157 and closes the check valve 158 in the exhaust duct 145. When the desired excess of gases has been vented, the control valve 156 is closed and the exhaust system 145–148 is ready to remove exhaust gases from the roasted batch present in the cooler 143.

It will be appreciated that the inclusion within the hot roasting air circulation of the catalytic converter 108, 138 substantially reduces the amount of smoke circulating within the hot air system thus improving the quality of the roast. At the same time, the utilization of the converter 108, 138 just downstream of the respective heating coils 107, 137 presents savings in energy as the heated air is utilized not only to roast the coffee in the roasting chamber 100, 130 but also to maintain the respective catalytic converter 108, 138 at an operative temperature.

Figure 13:
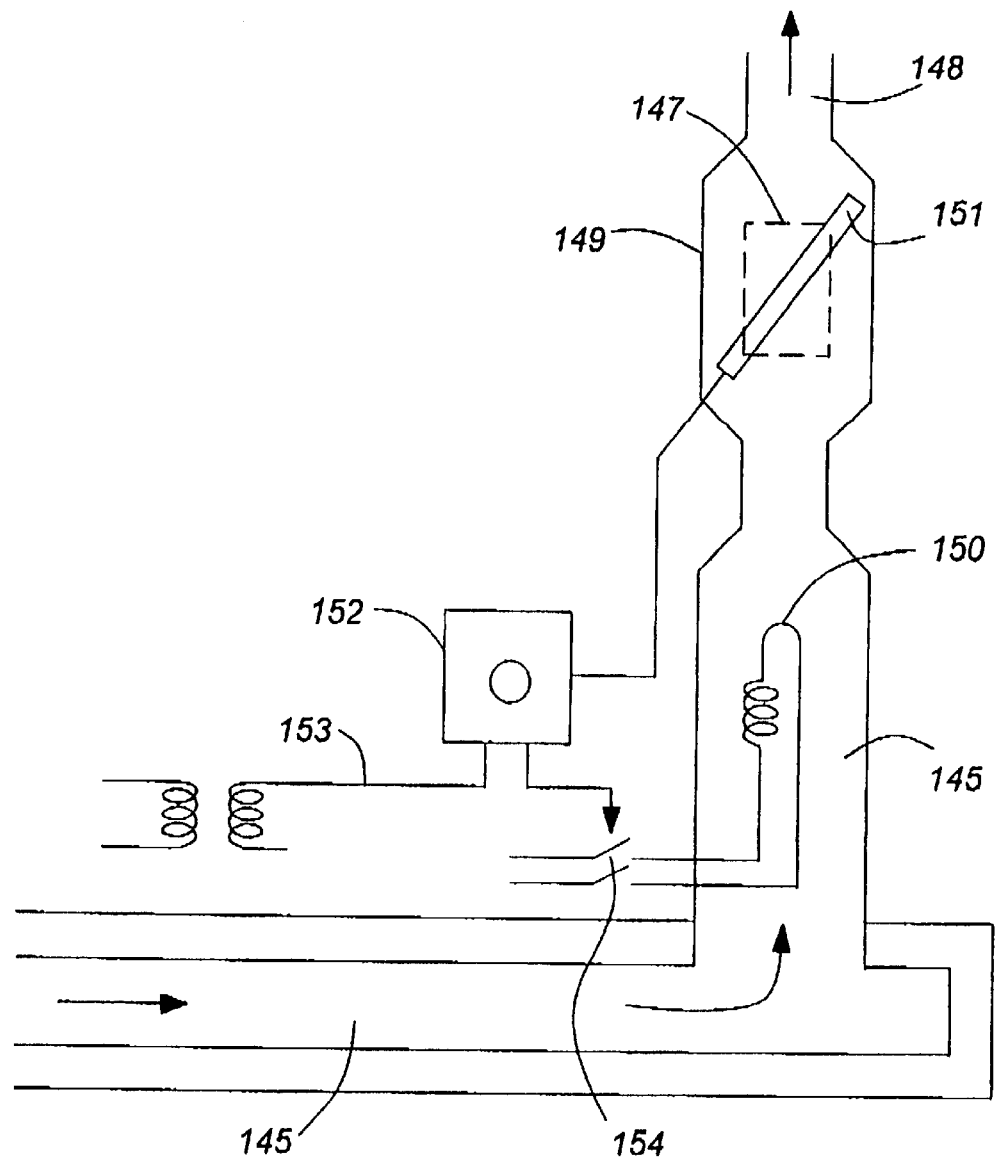
FIG. 13 is a diagrammatic representation of a preferred embodiment of a catalytic converter for use in air circulation systems of the present invention.

FIG. 13 shows a diagram of an exemplary embodiment of the operation of the catalytic converter 147. While described in relation to the embodiment of FIGS. 11 and 12, the same converter could be and is utilized in the first two embodiments described. Since the converter system is identical for any embodiment, it will suffice to refer in the following description only to FIGS. 11 and 12 as it will be understood that the arrangement in the embodiment of FIG. 9, 10 is the same.

Disposed within the housing 149 is the converter element which, as is well known, is a grid made of a catalyst reducing the volume of undesirable substances to be discharged from the discharge section. The converter requires a predetermined temperature to assure the burning of the undesired substances in the smoke drawn from the roasted batch contained in the cooler 143. A heating element 150 is located just upstream of the converter element 147.

The purpose of the heating element 150 is, first, to preheat the catalytic converter 147 to its operative range. Second, the element 150 gives a boost to the temperature of the exhaust air entering the converter. The converter 147 has to be at operative temperature before the actual exhaust or cooling is commenced. The air flow from the cooler 143 is most laden with smoke at the beginning of the process of cooling and the temperature of hot air from the cooler alone is insufficient to maintain the converter 147 operative.

A thermostat probe 151 in the converter housing 149 is operatively connected to a thermostat 152 which controls, by a 24V control circuit, a relay 154 of the circuit of the heating element 150. The heating element is typically a 2000 W element which normally suffices to maintain the smoke laden air flowing toward the converter 147 at a desired temperature. Typically, the thermostat would be set to maintain the converter 147 at an operating temperature of about 230° C. to about 245° C.

As mentioned above, the advantage of the third embodiment is in that it simplifies the control of the overall system as instead of a complex control of the operation of the four valves, the system simply controls the actuation of the two independent fan systems 135, 144. As already mentioned, the two fan systems have an overlapping function.

In a coffee roasting operation, the original moisture present in green coffee beans takes place. Then the roasting itself starts at a temperature of about 200° C. after which through exothermic reactions, escalation of the roasting process occurs which requires considerable control of the roasting for a given degree of roast. Reaction in green arabica coffee may start as low as 160° C. The reaction peaks at about 210° C. and falls off at about 250° C.

The most obvious physical change to occur is the external color which ranges from light brown to almost black. This change is accompanied by exudation of oil to the surface with increased severity of roasts. Swelling of beans also progressively occurs.

The invention utilizes, in its preferred application, the phenomenon of the roasting of coffee being accompanied by the popping or cracking of the beans leading to a considerable decrease of density as a function of the degree of roast but also of the speed of roasting. While different types of coffee beans behave in a different fashion during the roast, the cracking phenomenon always occurs and has a general pattern which is common to all types of coffee. According to the present invention, the peculiar pattern of the popping or cracking sound is followed as a variable which is indicative of the state of pyrolysis of the coffee beans being roasted.

The inventive method will now be described by way of examples. In one tested method, the variable of the cracking sound sensed and observed was mainly the volume of the sound. The different qualities of the sound (in the embodiment described, the volume) accompanying the roasting of the coffee can be divided into three stages:

(1) the level of background sound occurring at the outset of the heatup of the batch up to the first crack sound occurring at the beginning of pyrolysis of the beans;
(2) an interim period of a reduced level of sound following the first crack but preceding the second crack; and
(3) an increased level of crack sound when the pyrolysis of the beans is at its peak.

It has been established by sound analyses that, in general, the level of the sound developed during the roasting of a batch within the roasting chamber 20 during the first crack is higher than that observed during the interim period. Similarly, the sound level of the second crack is always higher than that of the interim period.

Experiments carried out in the context of the present invention point out to a relationship between the pronouncement of differences in sound levels at the respective stages and to the frequency measured.

Sound level spectra have been analyzed utilizing the present invention. The following table contains representative examples of measurements obtained with a particular type of coffee:

| Band<br>Hz | 1st Crack<br>dB | Interim<br>dB | 2nd Crack<br>dB |
|---|---|---|---|
| 971.63 | 31.5 | 28.6 | 30.0 |
| 1539.93 | 29.2 | 23.2 | 28.6 |
| 2053.53 | 32.2 | 32.2 | 29.2 |
| 2585.23 | 29.0 | 25.7 | 30.6 |
| 3447.46 | 33.5 | 28.6 | 34.6 |
| 5158.22 | 31.6 | 28.2 | 35.1 |
| 6493.81 | 25.2 | 21.0 | 29.0 |
| 9172.76 | 23.4 | 18.2 | 26.4 |

The duration of the 1st crack may vary from about 30 sec to about 90 sec and that of the interim and the 2nd crack depends on the desired degree of roast and on the type of coffee being roasted. It is typically from about 3 sec to about 90 sec. The table shows that with the increased band levels the distinction between the interim period is better pronounced and therefore can be used for the control of the operation of the roasting. Once the second crack occurs, the pyrolysis of the beans has reached the desired level and the roasting should be stopped. As mentioned above, the sound characteristics vary with different types of coffee beans but once established, they provide a reliable value for controlling the process.

The present invention thus provides an improved and simple way of determining the duration of the roasting of a particular type of coffee beans by
 (i) recognizing and differentiating the pattern of first and second cracking;
 (ii) providing the operator with a visual and/or sound signal that the second cracking has started;
 (iii) switching hot air to vent and open the fresh air inlet;
 (iv) starting timer to clock preset time for particular roast (light, medium, dark, very dark) and coffee type.

The invention allows the operator to automate the roasting process with a consistent result that cannot be achieved by prior art mentioned at the outset, namely the clocking of the time from the beginning of the process. The start of the clocking at the second crack, i.e. at a point when pyrolysis is at peak, provides a united point for any type of coffee beans, assuring consistent repeatability of the degree of roast for the particular type.

Further experiments with the present invention reveal that the beginning of the pyrolysis of the coffee bean batch in the roasting chamber can also be established by another successful method. This method, which may be additional to or a substitute of the method utilizing the analysis of the cracking sound as described, is based on measuring the surface temperature of beans being roasted.

A mentioned at the outset of this description, it is known to use a thermocouple which is indicative of instant temperature within the roasting chamber. This measurement cannot be used in accurately determining the start of the exothermic reaction and thus the start of the time interval required for roasting.

When green beans are in the roasting chamber, such as chamber 100 or 130, they are heated up by hot air until saturated. The saturation temperature is independent of the temperature of the roasting chamber. Once the thermal saturation point is achieved, the surface temperature of the beans will remain unchanged until the exothermic reaction starts. The start of an exothermic reaction is accompanied by further escalation of the surface temperature of the roasted beans.

Based on the above phenomenon, we measured the surface temperature of the beans by an infrared sensing apparatus 160 with accompanying board (FIG. 8*b*) which is commercially available as a product of Raytek Inc. and is sold under the trade name of RAYNGER STTM. The probe of the sensing apparatus was placed in the roasting chamber such as chamber 100 or 130 (not shown in FIGS. 9–12). The measurements showed that, at the commencement of a roasting cycle, the surface temperature of the roasted beans continuously increases until the saturation as referred to above. At this point, a short interim period of about 4 to 20 sec occurs during which there is virtually no increase in temperature. The end of the interim period, i.e. the start of the exothermic reaction, is accompanied by further increase of the surface temperature above the value of the interim period.

The infrared sensor located within the roasting chamber and directed toward the batch of the coffee beans provides accurate data of the surface temperature of the beans rather than the overall ambient temperature within the chamber. This is due to the fact that the infrared sensor, utilizing a laser beam, is generally directed against one bean at any short period of time. Of course, the number of the beans reached by the laser of the infrared sensor, is high due to the motion of the batch in the fluidized bed. The system used in this method and diagrammatically shown in FIG. 8*b* thus comprises the step of infrared measurements of the roasted bean temperature. The measurement results in the production of an electrical signal which is proportional to the bean temperature. A signal comparator 162, preceded by a volt meter 161, compares data previously obtained from the sensor to determine the point at which the temperature of the beans starts to increase again after the stabilized temperature during the interim period. A counter or timer 163 is then operative upon receipt of the signal from comparator 162, to start a predetermined countdown, to eventually indicate by the signal device 164 when the roasting process is to be terminated. In the prototype of this system, a visual and audio signal was used to indicate to the operator when to terminate the process.

The infrared device has to be maintained at room temperature and must therefore be protected from the heat generated in the chamber 100 or 130.

It was established that the end of the interim period occurs at the commencement of the pyrolysis of the roasted beans. It can thus be used in determining the beginning of a time period the end of which activates a suitable signal or actuation means required for stopping the roasting operation.

The sensing of the surface temperature can be used as a supplement or as a substitute of the sound analysis described above.

Other methods based on the following of the commencement of pyrolysis are readily conceivable. For instance, the commencement of pyrolysis of the roasted beans can also be followed, referring, as an example, to the embodiments of FIG. 9 or 11, by comparing the temperature of the air entering the catalytic converter 108, 138 and exiting from the converter. The volatiles released during the roasting process, seen as smoke, are burned in the catalytic converter causing the air temperature to rise. Pyrolysis is accompanied by a marked increase in released volatiles which, when converted to heat, promptly indicates the beginning of the exothermic reaction.

Such process (not shown in the drawings) would then utilize
 (a) a sensor with accompanying board to measure the temperature before the catalytic converter 108, 138 to give an electrical signal proportional to the temperature sensed;

(b) another sensor after the catalytic converter with accompanying board to produce an electric signal that is proportional to the temperature downstream of the converter 108, 138;

(c) a signal comparator that would compare the temperature measurements before and after the catalytic converter 108, 138, to indicate at which point the temperature of the air leaving the catalytic converter is higher than that of the incoming stream or at least increasing in temperature faster than the air entering the converter;

(d) a counter which, upon receiving a signal that the temperature exiting the catalytic converter exceeds the incoming air temperature, begins a predetermined countdown to indicate when the roasting process should be terminated; and (e) visual and/or audio signalling device to indicate to the operator when to terminate the roasting process.

Preferably, the temperature sensors used in this method would be located below the respective heating chamber 106, 136. The comparator, sensor boards, counter and signalling device would be located in an area convenient to the operator.

Those skilled in the art will readily appreciate that further modifications of the roasting system and method can be made without departing from the gist of the present invention as set forth in the accompanying claims.

What is claimed is:

1. Apparatus for roasting a batch of a type of coffee comprising:

(a) a roasting chamber having a bottom portion and a top portion and operatively associated with heated air supply flowing in a direction from said bottom portion to said top portion;

(b) a sound and/or temperature probe reaching into the roasting chamber;

(c) said sound probe being adapted to sense the pattern of noise generated by the batch in said chamber as it is being roasted;

(d) said temperature probe being adapted to sense the pattern of temperature increase of the surface of coffee beans in said roasting chamber;

(e) said probe and/or probes being operatively connected to a timing device adapted to actuate a signal upon expiry of a predetermined time from a predetermined point of the pattern sensed by the respective probe, a clocking device adapted to actuate a roasting cycle ending device.

2. The apparatus of claim 1, wherein said sound probe includes a tubular insert open at one end and reaching into said roasting chamber, the other end of the tubular insert being connected to a microphone operatively connected to an output relay adapted to start, upon the occurrence of a predetermined noise input conducted by said tubular insert to said microphone, said clocking device.

3. The apparatus of claim 1, wherein the temperature probe is an infrared sensor reaching into the roasting chamber.

4. The apparatus of claim 1, wherein said roasting cycle ending device is a signal device adapted to alert an operator of the apparatus to the end of the roasting cycle.

5. The apparatus of claim 4, wherein said signal device is at least one of an audio signal device and/or a visual signal device.

6. The apparatus of claim 1, wherein said roasting cycle ending device is an automatic roasting cycle interrupting device which includes an actuation device adapted to expose the roasting chamber thus exposing it to ambient air, and to discharge the batch of roasted coffee beans to a cooling device.

7. The apparatus of claim 1, wherein said roasting cycle ending device is an automatic cycle interrupting device which includes a valve for interrupting the flow of the heated air into said roasting chamber.

8. The apparatus of claim 1, wherein said roasting cycle ending device is an automatic roasting cycle interrupting device, comprising:

(a) an actuation device adapted to open the roasting chamber thus exposing it to ambient air, and to discharge the batch of roasted coffee beans to a cooling device; and (b) a valve actuator adapted to interrupt the flow of the heated air into said roasting chamber.

* * * * *